(12) United States Patent
Ignatyev

(10) Patent No.: US 11,178,065 B2
(45) Date of Patent: Nov. 16, 2021

(54) SYSTEM AND METHODS FOR OPTIMAL ALLOCATION OF MULTI-TENANT PLATFORM INFRASTRUCTURE RESOURCES

(71) Applicant: ORACLE INTERNATIONAL CORPORATION, Redwood Shores, CA (US)

(72) Inventor: Oleksiy Ignatyev, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 280 days.

(21) Appl. No.: 16/534,201

(22) Filed: Aug. 7, 2019

(65) Prior Publication Data

US 2021/0044535 A1 Feb. 11, 2021

(51) Int. Cl.
*H04L 12/24* (2006.01)
*G06F 9/50* (2006.01)
(Continued)

(52) U.S. Cl.
CPC ............... *H04L 47/70* (2013.01); *G06F 9/50* (2013.01); *G06F 16/2237* (2019.01);
(Continued)

(58) Field of Classification Search
CPC ........... G06F 17/00–40; G06F 9/45533–2009/45595; G06F 9/50–5094; H04L 41/00–5096; G06N 3/00–20/20
See application file for complete search history.

(56) References Cited

U.S. PATENT DOCUMENTS 6,996,615 B1 2/2006 McGuire
8,478,782 B1 7/2013 Kuruganti et al.
(Continued)

FOREIGN PATENT DOCUMENTS

WO 2013152216 A1 10/2013

OTHER PUBLICATIONS

M. Bagaa, T. Taleb and A. Ksentini, "Service-aware network function placement for efficient traffic handling in carrier cloud," 2014 IEEE Wireless Communications and Networking Conference (WCNC), 2014, pp. 2402-2407, doi: 10.1109/WCNC.2014.6952725. (Year: 2014).*

(Continued)

*Primary Examiner* — David R Lazaro
*Assistant Examiner* — Julian Chang
(74) *Attorney, Agent, or Firm* — Kraguljac Law Group, LLC

(57) ABSTRACT

A system and associated processes to allocate tenants to platform resources are disclosed. A set of vectors corresponding to a plurality of tenants to be allocated is generated. A target vector establishing a desired value of a sum of vectors allocated to a first platform resource is determined. A first vector included in the set of vectors that satisfies a defined relationship with the target vector is identified, and a tenant corresponding to the first vector is allocated to the platform resource as a result. It is determined whether a second vector satisfies a defined relationship with both the target vector and the first vector exists. If so, a tenant corresponding to the second vector is allocated to the first platform resource. If not, the tenant corresponding to the second vector is allocated to a second platform resource, that is different from the first platform resource.

20 Claims, 5 Drawing Sheets

(51) Int. Cl.
| | |
|---|---|
| *G06F 17/16* | (2006.01) |
| *G06F 17/11* | (2006.01) |
| *H04L 12/911* | (2013.01) |
| *G06F 16/22* | (2019.01) |
| *H04L 29/08* | (2006.01) |
| *G06F 9/455* | (2018.01) |

(52) U.S. Cl.
CPC .......... *G06F 16/2264* (2019.01); *G06F 17/16* (2013.01); *H04L 41/0893* (2013.01); *H04L 67/10* (2013.01); *G06F 9/45533* (2013.01); *G06F 17/11* (2013.01); *H04L 41/14* (2013.01)

(56) References Cited

U.S. PATENT DOCUMENTS

| | | | |
|---|---|---|---|
| 8,560,571 B1 | 10/2013 | Lai et al. | |
| 8,706,772 B2 | 4/2014 | Hartig et al. | |
| 8,868,605 B2 | 10/2014 | Kuruganti et al. | |
| 9,733,921 B1 | 8/2017 | Saenz et al. | |
| 9,742,435 B1* | 8/2017 | Poghosyan | H03M 7/46 |
| 10,354,201 B1* | 7/2019 | Roy | G06N 20/00 |
| 10,592,328 B1* | 3/2020 | Thompson | G06F 11/0793 |
| 10,594,620 B1* | 3/2020 | Greenwood | G06F 9/5083 |
| 2003/0120780 A1* | 6/2003 | Zhu | H04L 67/101 709/226 |
| 2010/0049570 A1 | 2/2010 | Li | |
| 2010/0077449 A1* | 3/2010 | Kwok | G06F 9/5027 726/3 |
| 2012/0324073 A1 | 12/2012 | Dow | |
| 2013/0138889 A1* | 5/2013 | Chockier | G06F 11/3466 711/129 |
| 2013/0138891 A1* | 5/2013 | Chockier | G06F 12/121 711/133 |
| 2014/0019415 A1 | 1/2014 | Barker | |
| 2014/0082165 A1 | 3/2014 | Marr | |
| 2016/0078454 A1* | 3/2016 | Ellen | H04L 67/306 705/7.29 |
| 2016/0359697 A1* | 12/2016 | Scheib | G06F 16/122 |
| 2017/0019302 A1* | 1/2017 | Lapiotis | H04L 41/145 |
| 2017/0072568 A1 | 3/2017 | Hitchcock et al. | |
| 2017/0109212 A1* | 4/2017 | Gaurav | G06Q 10/00 |
| 2017/0177995 A1* | 6/2017 | Hillar | G06F 16/35 |
| 2017/0220365 A1* | 8/2017 | Dow | G06F 9/5088 |
| 2017/0318083 A1* | 11/2017 | Ignatyev | H04L 67/1023 |
| 2018/0212837 A1* | 7/2018 | Kalluri | H04L 41/147 |
| 2018/0255122 A1* | 9/2018 | Hu | G06F 11/3006 |
| 2018/0349797 A1* | 12/2018 | Garvey | G06F 9/5077 |
| 2018/0365298 A1* | 12/2018 | Poghosyan | G06F 17/18 |
| 2019/0007410 A1* | 1/2019 | Hu | H04L 47/70 |
| 2019/0102155 A1* | 4/2019 | Garvey | G06F 8/60 |
| 2019/0123983 A1* | 4/2019 | Rao | H04L 41/0893 |
| 2019/0147075 A1* | 5/2019 | Bal | H04L 41/00 707/792 |
| 2019/0230000 A1* | 7/2019 | Moghe | H04L 41/22 |
| 2019/0317829 A1* | 10/2019 | Brown | G06F 11/3442 |
| 2019/0354388 A1* | 11/2019 | Mitra | G06F 9/547 |
| 2020/0014594 A1* | 1/2020 | Lapiotis | H04L 41/0803 |
| 2020/0050662 A1* | 2/2020 | Bhat | G06N 20/00 |
| 2020/0073953 A1* | 3/2020 | Kulkarni | G06F 16/248 |
| 2020/0134759 A1* | 4/2020 | Refila | G06K 9/6262 |
| 2020/0151253 A1* | 5/2020 | Wohlwend | G06N 3/08 |
| 2020/0151254 A1* | 5/2020 | Wohlwend | G10L 15/26 |
| 2020/0162503 A1* | 5/2020 | Shurtleff | H04L 41/0654 |
| 2020/0177485 A1* | 6/2020 | Shurtleff | H04L 67/22 |
| 2020/0225046 A1* | 7/2020 | Stewart | G01C 21/34 |
| 2020/0341832 A1* | 10/2020 | Poghosyan | G06K 9/6282 |
| 2020/0341833 A1* | 10/2020 | Poghosyan | G06F 11/3058 |
| 2020/0348979 A1* | 11/2020 | Calmon | G06F 9/5033 |
| 2020/0351383 A1* | 11/2020 | Jayaraman | G06N 3/02 |
| 2020/0371825 A1* | 11/2020 | Mathew | G06N 5/02 |
| 2020/0409758 A1* | 12/2020 | Calmon | G06F 9/505 |
| 2021/0021469 A1* | 1/2021 | Sondur | H04L 41/0843 |
| 2021/0027136 A1* | 1/2021 | Hwang | G06K 9/627 |
| 2021/0035025 A1* | 2/2021 | Kalluri | G06K 9/6272 |

OTHER PUBLICATIONS

W. Su, J. Hu, C. Lin and S. Shen, "SLA-Aware Tenant Placement and Dynamic Resource Provision in SaaS," 2015 IEEE International Conference on Web Services, 2015, pp. 615-622, doi: 10.1109/ICWS.2015.87. (Year: 2015).*

Kwok, Thomas, and Ajay Mohindra. "Resource calculations with constraints, and placement of tenants and instances for multi-tenant SaaS applications." International Conference on Service-Oriented Computing. Springer, Berlin, Heidelberg, 2008. (Year : 2008).*

E. Yang, Y. Zhang, L. Wu, Y. Liu and S. Liu, "A Hybrid Approach to Placement of Tenants for Service-Based Multi-tenant SaaS Application," 2011 IEEE Asia-Pacific Services Computing Conference, 2011, pp. 124-130, doi: 10.1109/APSCC.2011.35. (Year: 2011).*

W. Huang, X. Li and Z. Qian, "An Energy Efficient Virtual Machine Placement Algorithm with Balanced Resource Utilization," 2013 Seventh International Conference on Innovative Mobile and Internet Services in Ubiquitous Computing, 2013, pp. 313-319, doi: 10.1109/IMIS.2013.59. (Year: 2013).*

European Patent Office, Extended European Search Report issued in EP Application No. 20186503.7-1203 dated Dec. 22, 2020 (12 pgs).

Kwok Thomas et al.: "Resource Calculations with Constraints, and Placement of Tenants and Instances for Multi-tenant SaaS Applications", Dec. 1, 2008 Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine Le pp. 633-648.

Xianzhang, Chen et al.: "A Dynamic Resource Balance Algorithm for Multi-tenant Placement Problem in Saas", Service Sciences (ICSS), 2013 International Conference on, IEEE, Apr. 11, 2013 pp. 123-128.

Enfeng Yang et al.: "A Hybrid Approach to Placement of Tenants for Service-Based Multi-tenant SaaS Application", Services Computing Conference (APSCC), 2011 IEEE Asia-Pacific, IEEE Dec. 12, 2011 pp. 124-130.

U.S. Office Action dated Sep. 26, 2019 for co-pending U.S. application for Netsuite Inc., U.S. Appl. No. 15/417,564, filed Jan. 27, 2017. (pp. 1-11).

* cited by examiner

SYSTEM AND METHODS FOR OPTIMAL ALLOCATION OF MULTI-TENANT PLATFORM INFRASTRUCTURE RESOURCES

BACKGROUND

A multi-tenant architecture provides a means for multiple accounts (tenants) and users to store and access their data, and to utilize specific applications that reside on a remote platform. The platform is typically implemented as a plurality of (K) servers or server groups, and is administered and operated by another party that provides use of the platform infrastructure as a service to the accounts and each account's users. This service may provide data storage, computational processing power, data analytics, and applications or workflows that may be executed with reference to an account's data (in whole or in part, and account-wide or user-specific). In some cases, such services have been described as Software-as-a-Service (SaaS), cloud-based services, web-services, or remote services.

Multi-tenant environments experience varying demands for the platform resources by the plurality (N) of tenants. The demand, at times, will exceed the finite supply of such resources available over a communication network as a cloud-based application. Illustrative examples of the resources include, but are not limited to at least one of: computational data processing capabilities, data storage capacity, pre-processing/optimization techniques, network bandwidth, etc.

Examples of applications that reside on the servers of a platform may be used to process certain of a user's data by instantiating an occurrence of the application within the user's account; for these types of uses, the applications may be used in the operation of a business, such as ERP, CRM, HR (HCM), eCommerce, and financial applications. Tenant customizations to the operation of the architecture may include custom functionality (such as the capability to perform tenant or user-specific functions, workflows, data processing, or operations) built on top of lower level operating system functions.

Some multi-tenant service platforms may offer the ability to customize functions or operations at several different levels of the service platform, from aesthetic modifications to a graphical user interface to providing integration of components and/or entire applications developed by independent third-party vendors. This can be very beneficial, since by permitting use of components and/or applications developed by third party vendors, a multi-tenant service can significantly enhance the functionality available to tenants and increase tenant satisfaction with the platform.

In other cases, the applications may be ones used by a platform operator or administrator to manage the platform's operation, such as by managing the allocation of the resources available to the platform users. In this use case, the applications may be used to monitor events within a set of the users of an account, to manage an aspect of an account or set of accounts, or to determine metrics relating to the events initiated by a user, a set of users, an account, or a set of accounts, etc. In such cases, the resources being allocated and re-allocated may include access to computational data processing capabilities, data storage capacity, pre-processing/optimization techniques, etc., and may be distributed among multiple sources (servers, server groups, data storage elements, etc.).

Platform operators and administrators need to be able to alter how platform resources are allocated to (and used by) each account or a set of accounts in order to ensure optimal use of the resources, respond to system operational problems, or to execute a business plan involving segmented levels/qualities of service. For example, the available resources are distributed in the multi-tenant platform among the K different network-connected servers. At times when the demand for platform resources exceeds the supply, the resources distributed among the K servers must be allocated to the multiple tenants requesting those resources. Inequitably allocating the available resources can cause some tenants to experience diminished computational performance, or even cause some tenants to be excluded from the resource allocation altogether. Embodiments of the inventive system and methods are directed to providing ways to characterize resource usage data by account or tenant, and to process that data to enable platform operators and administrators to make more optimal decisions regarding allocation or allocation changes for platform infrastructure resources. Such decisions may involve placement of a new tenant or set of users' accounts on a specific server or server group, reallocation of one or more accounts, tenants, or users to a specific server or server group, or adjusting constraints or conditions on a tenant's or a set of users' access to certain platform resources.

SUMMARY

Embodiments of the inventive system and methods are directed to overcoming the limitations associated with conventional approaches to managing the allocation of cloud-based resources to a plurality of tenants, individually and collectively.

Embodiments of the present technology distribute N tenants among K different servers in such a way that demand for resources satisfies an available supply. Both N and K are integer values of at least 2. At times when supply is insufficient to fully satisfy the total demand generated by the N tenants, then the N tenants are distributed among K different servers in such a way that no one specific tenant is being "hurt" significantly more than some other tenants.

"Hurt," in the context of the present application, means that some tenants would experience degraded computational performance (for example, slow execution of network operations) because of an assumption that there is insufficient supply of a given resource to satisfy the demands of all tenants to maintain normal cloud operations. Normal cloud operations are the performance of cloud operations experienced when the supply of computational resources exceeds the demand for those resources. Those operations could be, for example, one of the following: financial transactions, purchase orders, SQL based queries, search based queries etc.

For embodiments where the supply of resources provided by the K different servers is enough to fully satisfy a total demand generated by the N different tenants, the tenants can be distributed among the K servers so the network-accessible resources are allocated approximately evenly among the K different servers. In other words, the demand for the resources experienced or satisfied by each of the K different servers is approximately the same. Each of the K servers can maintain evenly distributed "room" or excess supply in terms of resources available from each server. By supplying available, and otherwise unused resources substantially uniformly with each of the K different servers, the platform ensures that each of the K servers maintains at least some capacity to satisfy a portion of a spike in a demand for that resource. Thus, a scenario can be avoided where a first server is operating at capacity, possibly causing some tenants to experience a degraded network performance, while a second server is operating well below capacity.

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention provide a mechanism for a multi-tenant platform operator or administrator to make more optimal decisions with regards to the allocation of platform infrastructure resources (such as computational capabilities, data storage, etc.) among one or more tenants or accounts. In some embodiments, the inventive methods construct a data "signature" for a set of identified users, accounts, or tenants, where the signature contains data regarding the user, account, or tenant's "consumption" of platform infrastructure resources. This consumption may be expressed in terms of any suitable metric, such as a value or number that represents the number or relative number of events that the user, account, or tenant has initiated within a specified time frame, the number of CPU cycles utilized by the user, account, or tenant during a specific time interval, or the maximum amount of data storage utilized within a specified time frame, with the origin of the time frame(s) involved being synchronized for all users, regardless of location and local time zone.

In some embodiments, each hour or other time increment (e.g., minute, day, month, etc.) may be represented as a dimension of a multi-dimensional vector that represents a tenant's consumption of one or more platform infrastructure resources within a day, for example. Such "signature" vectors for one user or account/tenant may be subjected to appropriate data processing (including, but not limited to, or required to include machine learning, statistical analysis, pattern matching, etc.) to identify usage metrics or trends in such metrics among users of an account or tenant.

As a more-specific example, demand for a resource by any specific tenant can be modeled as vector, where each dimension of the vector represents some time unit (minute, hour, day, month etc). For example, to describe daily resource demand in terms of 1-hour incremental intervals, each tenant's demand is represented as a 24-dimensional vector (i.e., one dimension for each of 24 hours in a day). To describe yearly resource demand in terms of 1 day incremental intervals, then each tenant's demand for the resource can be modeled as a 364-dimensional vector.

Similarly, signature vectors for multiple users, accounts or tenants may be subjected to appropriate data processing in aggregate (including, but not limited to, or required to include machine learning, statistical analysis, pattern matching, etc.) to identify broader usage metrics and investigate larger scale resource demands over time, between locations, within industries, across verticals, etc.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
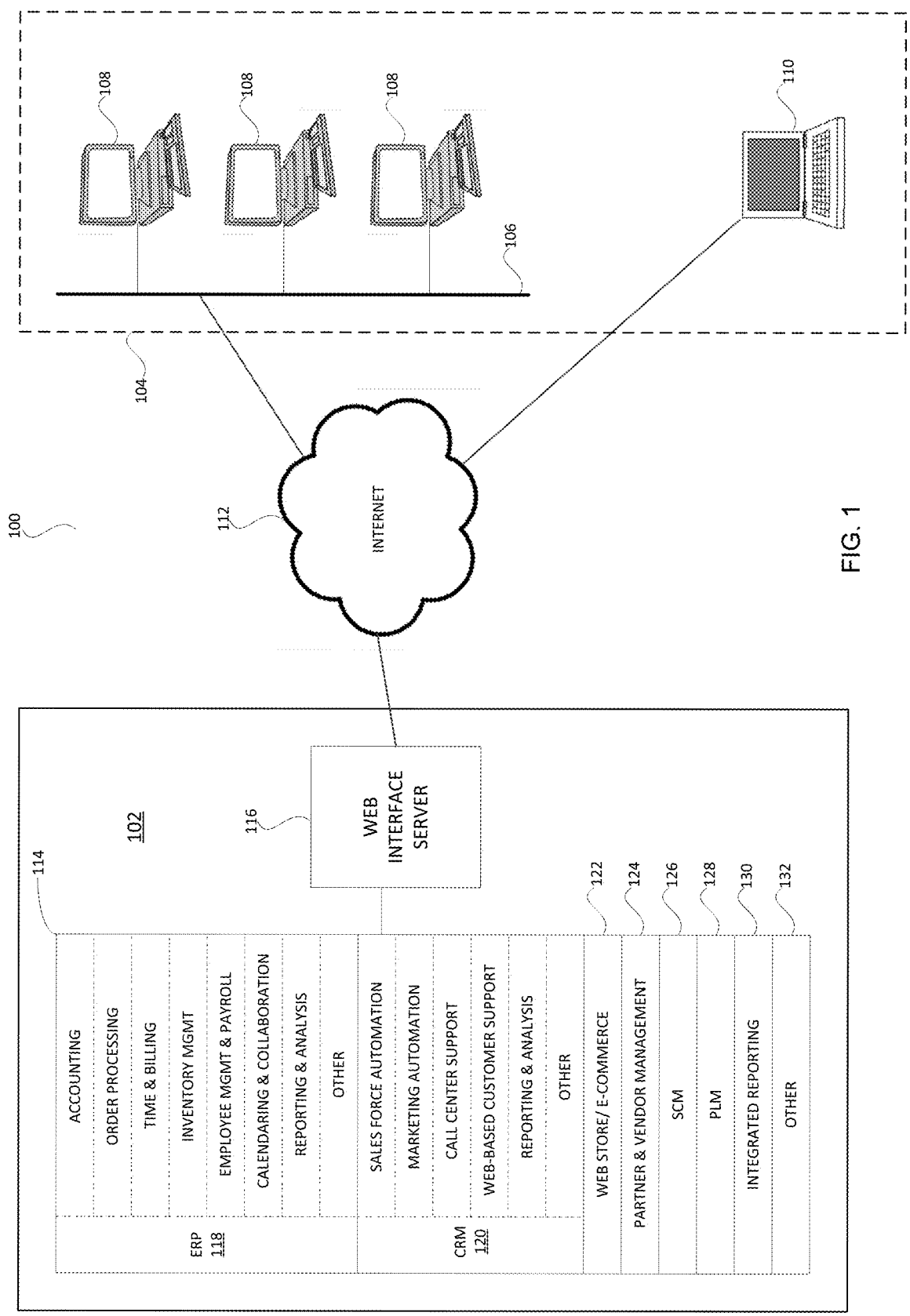
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention provide a mechanism for a multi-tenant platform operator or administrator to make more optimal decisions with regards to the allocation of platform infrastructure resources (e.g., computational capabilities, data storage, usage of an extension to a platform application, access to a restricted feature, etc.) among one or more tenants or accounts. In some embodiments, the inventive methods construct a data "signature" for a set of identified users, accounts, or tenants, where the signature contains data regarding the user, account, or tenant's "consumption" or utilization of one or more platform infrastructure resources. This consumption may be expressed as a value or number that represents one or more of the number or relative number of events that the user, account, or tenant has initiated within a specified time interval, the number of CPU cycles utilized by the user, account, or tenant during a specific time interval, or the maximum amount of data storage utilized within a specified time interval, with the origin of the time frame(s)/intervals involved being synchronized for all users, regardless of location and local time zone.

Although an embodiment of the inventive system and methods may be used to assist in making infrastructure resource allocation decisions in a variety of operating environments, it is particularly applicable for use as part of managing or operating a multi-tenant platform. One reason for this is that such a platform provides services to a relatively large number of separate accounts or clients, and each account may have its own associated resource usage characteristics, agreed upon quality-of-service (QoS) to be provided, short or longer-term spikes in resource demand, etc. This may make it more difficult for a platform manager or operator to identify and respond to trends or factors that influence infrastructure resource demand as the number of accounts and the number of users within those accounts increases. Note that although an example environment in which an embodiment of the inventive system and methods is that of a multi-tenant platform used to deliver Software-as-a-Service (SaaS), other computing or data processing architectures may also benefit by using an embodiment of the invention (such as client-server architectures with a large number of client users).

As noted, in some embodiments, the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 1-3. As noted, embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher-level cloud services typically focus on one or more well-defined end user applications, such as business-oriented applications. Some high-level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object-oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management (HR or HCM), and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. With differing levels of overlap with ERP/CRM initiatives and with each other, efforts have also been directed toward development of increasingly integrated partner and vendor management systems, as well as web store/eCommerce, product lifecycle management (PLM), and supply chain management (SCM) functionality.

FIG. 1 is a diagram illustrating a system 100, including an integrated business system 102 and an enterprise network 104 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access method. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both the integrated business server 114 and the web interface server 116 may be implemented on one or more different hardware systems and components, even though represented as singular units in FIG. 1. In one embodiment, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 2:
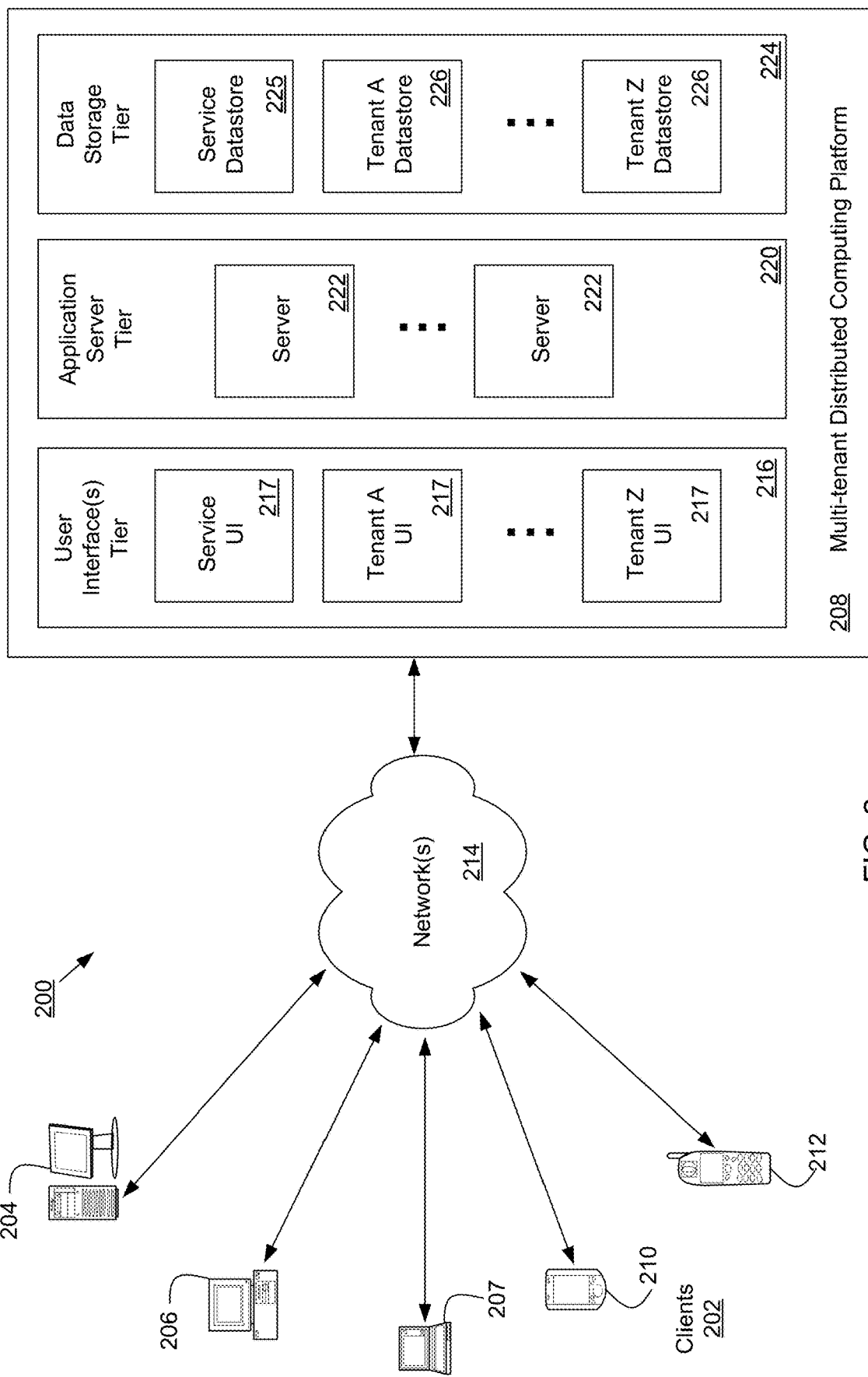
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions.

The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained by using an integrated business system comprising ERP, CRM, and other business capabilities, as for example where the integrated business system is integrated with a merchant's eCommerce platform and/or "webstore." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system (e.g., its user interfaces, applications, or workflow) to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a third-party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer (or in some cases, an operator of the platform) may create an extension to an application that is available to users through a multi-tenant data processing platform. The extension may add new functionality or capabilities to the underlying application. One or more tenants/users of the platform may wish to add the extension to the underlying application to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) to obtain feedback for improving the newer version of the extension, to test the stability of the extension, or to assist them to segment the market for their extension(s).

Figure 3:
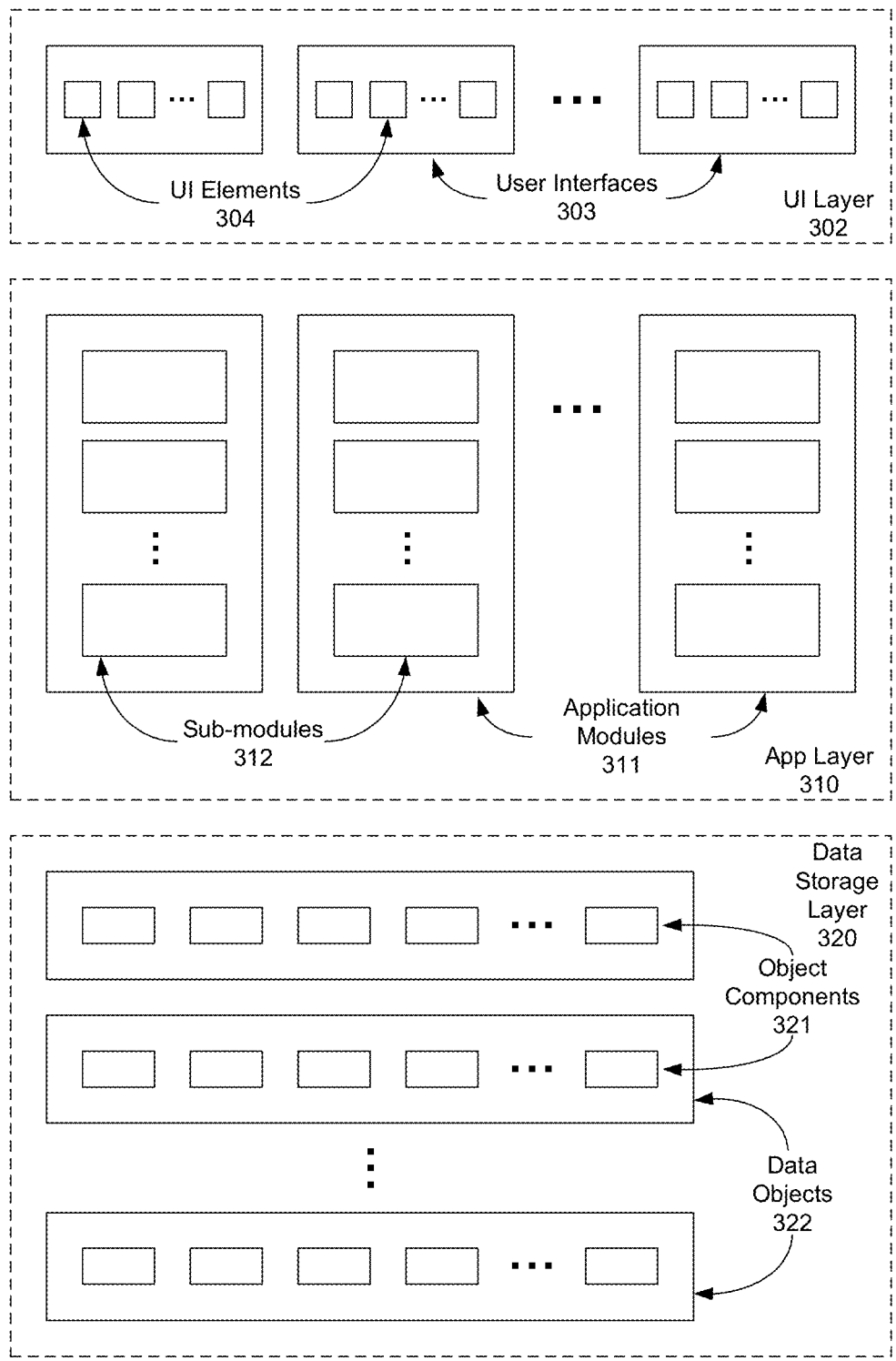
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, controller, computing device, etc.). In a complex system, such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or another functionality to a user of the platform). Such function, method, process, or operation may also include those used to implement one or more aspects of the inventive system and methods, such as for:

accessing data that may be used to characterize the resource(s) used by a user, account or tenant, or by a group of users, set of accounts, etc., where the resource(s) may include one or more of
computational data processing resources;
data storage capacity;
database file structures or data schemas;
optimization, data pre-processing, or data filtering processes;
specified extensions or value-add capabilities to the functionality of a data processing platform, a specific application or an account;
computing, constructing or deriving a relevant "signature" for each user or account, or for each set of users, or for a set of accounts, etc.;
implementing a decision process to determine an optimal or more optimal allocation of users, accounts or tenants to one or more resources (or an optimal or more optimal allocation of one or more resources to a user, account, set of accounts, etc.), where the decision process may depend upon one or more of
a status of the resources being used by the user, account, or tenant, or by an aggregate set of the same (where the status may be expressed relative to a maximum capacity, relative to a desired operating level, etc.);
a current or expected demand for a resource or resources by the user, account, or tenant (based, for example, on a value of certain parameters related to the operational status of a business or organization of which the user is a part, such as inventory, revenue, inventory velocity, sales, number of employees, expansion planning, project planning, etc.);
an agreed upon level or quality of service (QoS) to be provided to the user, account, or tenant by the platform operator;
a status or expected status of the platform as a whole with regards to resource demand, load balancing, or another platform operational metric; and
implementing a decision process to perform one or more of (a) assignment of an account (i.e., a tenant) or set of accounts to a server, (b) current or future planning of infrastructure requirements (based on current or expected demand and tenant or user levels), (c) modeling of possible allocation scenarios and their sensitivity to changes in the number or resource usage of tenants or users.

Note that by accessing and processing data regarding resource usage and possible demand (such as indicators of possible demand based on machine learning or other data processing techniques) across multiple tenants, embodiments of the inventive system and methods may be able to better allocate resources or "predict" potential resource demand across an industry or set of tenants, with this capability being possible in real-time or near real-time.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

As noted, the example computing environments depicted in FIGS. 1-3 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include those having devices (including mobile devices), software applications, systems, apparatuses, networks, or other configurable components that may be used by multiple users for data entry, data processing, application execution, data review, etc. and which have user interfaces or user interface components that can be configured to present an interface to a user.

Although further examples below may reference the example computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

Embodiments of the inventive system and methods control the usage of resources of a cloud-based platform infrastructure by each tenant/account on a daily, weekly, monthly, annually or another basis. Generally, this is accomplished in part by an analysis module that generates a set of vectors $X_i$ that includes values indicative of resource consumption by the tenants. A vector is generated for each of N tenants. A Targeted Vectors Distribution Steepest Descent ("TVDSD") Algorithm is applied to establish a distribution of the vectors representing the N tenants to the K different servers.

A fitness metric is determined based on a result of the distribution. The fitness metric is compared to a threshold to determine whether the distribution established according to the TVDSD is within an acceptable tolerance of an optimal distribution. If the distribution is suitably close to the optimal distribution, the servers are caused to be allocated to the tenants, or vice versa, according to the distribution. If the distribution is determined not to be suitably close to the optimal distribution based on the comparison of the fitness metric to the threshold, the TVDSD algorithm can be applied again to re-allocate the tenants to the servers, or vice versa.

A The present technology can be used by an infrastructure management team, or used by an automated process, to better (i.e., more optimally) distribute the different tenants/accounts among a plurality of servers and/or other infrastructure elements of the platform. This type of resource allocation methodology is expected to improve the performance of the platform software in each server of the cloud, and help to optimize allocation of the financial and support resources provided by the platform operator/administrator.

Figure 4:
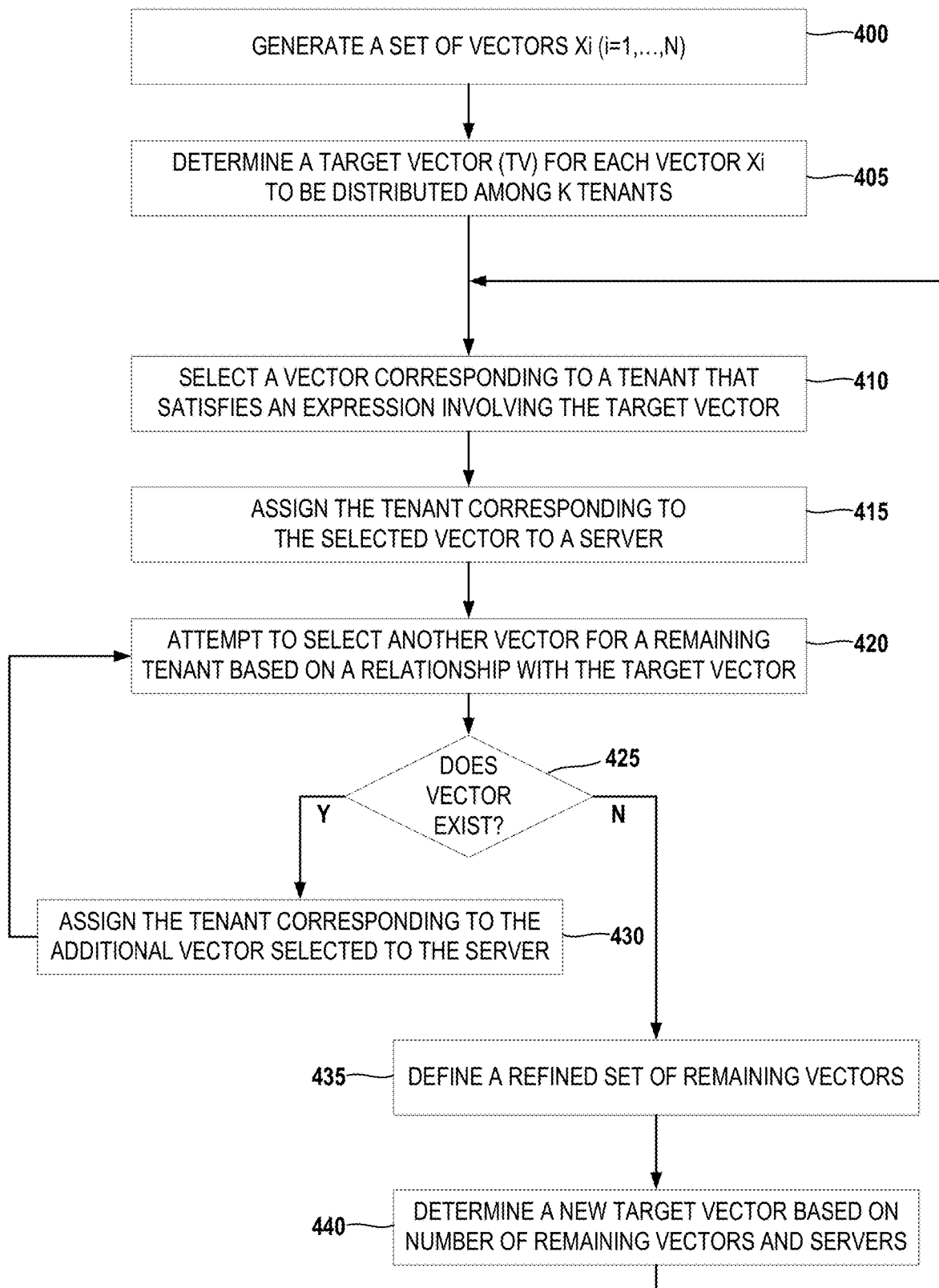
FIG. 4 is a flow chart or flow diagram illustrating a set of stages or steps that may be used to perform a process, method, function or operation (such as the tenant allocation process utilizing the TVDSD algorithm described herein) as part of implementing an embodiment of the inventive system and methods.

More specifically, FIG. 4 is a flow diagram schematically illustrating an embodiment of a process for automatically distributing N tenants among K different servers. The distribution off N tenants among the K servers promotes satisfaction of a demand for resources by an available supply of the server resources. A vector X is generated at block 400 for each of the N tenants to be distributed among the K servers. According to one embodiment, the vectors $X_i$ can be generated by receiving, with a computer processor, values of the resource demand from a specific tenant during dimensions that correspond to a defined time increment. The received values can be used to generate a data structure comprising one or more of the vectors $X_i$.

For example, consider a vector for tenant N=1 ("N1") including values indicative of usage of CPU computational resources of a server by the tenant N1 at hourly increments. The vector for tenant N1, expressed herein as $X_1$, will have 24 dimension values corresponding to the 24 hours in a day. The vector $X_i$ can be expressed generally as:

$$X_i = (X_{i1}, X_{i2}, \ldots, X_{in}) \tag{1}$$

where i=1, . . . , N; N is the number of the tenants (and corresponding vectors) to be allocated to the K servers; and n is a positive integer, representing the number of dimensions of the vectors $X_i$. In the above example for tenant N1 and CPU usage on an hourly basis, i=1 and n=24.

A Euclidean norm of the vector $X_i$ is denoted $\|X_i\|$. For purposes of the present example, the following assumptions apply:

A: $\|X_i\| > 0$
   for all i=1, . . . , N; and
B: $X_{ij} \geq 0$
   for all 1=1, . . . , N and j=1, . . . , n The current embodiment of the process for allocating the N tenants among the K different servers can be iterative. A plurality of the N tenants can be allocated to one server K, before another plurality of the N tenants is then allocated to a different one of the K servers. As part of this iterative process, a target vector (TV) is determined for the set of vectors $X_i$ corresponding to the tenants to be distributed to one of the different servers at block 405. The target vector TV is referred to as a "target" because it establishes a desired value of the sum $S_j$ of all the vectors $X_i$ corresponding to tenants allocated to a given server, included among the K servers. For example, the sum of all the vectors $X_i$ corresponding to tenants allocated to a first server can approach, be within a defined maximum deviation from, or be approximately the same as the target vector TV. Generally, the sum $S_j$ of all the vectors $X_i$ corresponding to tenants allocated to a given server should be as close as possible, or practical in terms of computational complexity, to the target vector TV. According to a specific example, the target vector TV can be defined as:

$$TV = \frac{\sum_{i=1}^{N} X_i}{K} \quad (2)$$

The TVDSD uses the target vector TV to allocate tenants to a first server $K_1$ at block 410. For the sake of brevity, allocating tenants to the first server $K_1$ is casually referred to herein as "filling a first bucket $B_1$." Likewise, allocating tenants to a second server $K_2$ is casually referred to herein as "filing a second bucket $B_2$," and so on. An example of filling the first bucket $B_1$ involves selecting a vector $X_m$, from among the vectors $X_i$, where $i=1, \ldots, N$, such that the Euclidean norm of the difference between the target vector TV and the vector $X_m$ is less than or equal to the Euclidean norm of the differences between the target vector TV and each of the other vectors $i=1, \ldots, N$. In other words, filling the first bucket $B_1$ can involve selecting $X_m$ to satisfy the expression:

$$\|TV-X_m\| \leq \|TV-X_i\| \text{ for all } i=1, \ldots, N; i \neq m. \quad (3)$$

The tenant corresponding to the vector $X_m$ is allocated to the first server $K_1$ at block 415. As a result, the network-accessible resources demanded by the tenant corresponding to the vector $X_m$ are caused to be supplied by the first server $K_1$.

According to the TVDSD, filling the first bucket $B_1$ can continue by attempting to select another vector $X_p$, at block 420, from among the remaining vectors $i=1, \ldots, N$, $i \neq m$, to be allocated to the first server $K_1$. The remaining vectors are those vectors corresponding to tenants not already selected for allocation to a server such as the first server $K_1$. In other words, the vector $X_m$ is excluded from the set of vectors under consideration as part of the analysis to determine whether the vector $X_p$ exists. The second vector $X_p$ may or may not exist. The second vector $X_p$, if it exists, can be selected as the vector $X_p$, from among the remaining and unallocated vectors $X_i$, that minimizes a Euclidean norm of a difference between: (a) the target vector TV, and (b) a combination of the selected vector $X_m$ satisfying expression (3) and the second vector $X_p$. According to a specific embodiment, the second vector $X_p$, if it exists, is the vector $X_p$ that satisfies the expression:

$$\|TV-X_m-X_p\| \leq \|TV-X_m-X_i\| \text{ for all } i=1, \ldots, N; i \neq m, i \neq p \quad (4)$$

If the vector $X_p$ that satisfies expression (4) is determined to exist at block 425, the tenant corresponding to vector $X_p$ is selected for allocation to the first server (i.e., used to fill the first bucket $B_1$) at block 430. Filling the first bucket $B_1$ continues by attempting to select a third vector $X_q$ at block 420, from among the remaining, unallocated vectors $X_i$, that satisfies the expression:

$$\|TV-X_m-X_p-X_q\| \leq \|TV-X_m-X_p-X_i\| \text{ for all } i=1, \ldots, N; i \neq m, p, q \quad (5)$$

If the vector $X_q$ that satisfies expression (5) is determined to exist at block 425, the tenant corresponding to vector $X_q$ is selected for allocation to the first server corresponding to the first bucket $B_1$ at block 430. According to the TVDSD, filling the first bucket $B_1$ continues by repeatedly attempting to select vectors from among the remaining, unallocated vectors $X_i$. Selected vectors are determined to exist if they satisfy the growing expression built according to the trend established by expressions (3)-(5). In other words, the most-recently selected vector is added to the expression that was satisfied to allocate that most-recent vector to a server. A vector that satisfies the modified expression is the vector that results in a Euclidean norm that is no greater than the Euclidean norm generated as a function of each of the other remaining vectors.

If the vector $X_p$ or $X_q$ that satisfies expression (4) or expression (5), respectively, is determined not to exist at block 425, the TVDSD algorithm progresses to fill the second bucket $B_1$. The set of remaining vectors $X_i$ from which one or more vectors are to be selected to fill the second bucket $B_2$ is redefined at block 435. For example, the vectors for the remaining, unallocated tenants can be denoted Xi, for $i=1, \ldots, N_2$, where $N_2$ is the total number of tenants (and corresponding vectors) that have yet to be distributed among the K servers. For an embodiment where $X_p$ is determined to exist at block 425, but $X_q$ is determined at block 425 not to exist, the remaining, unallocated tenants are associated with vectors $X_i$, where $i=1, \ldots, N$, $i \neq m$, $i \neq p$. In other words, $N_2$ includes two fewer tenants because the tenants associated with $X_m$ and $X_p$ were allocated to the first server $K_1$.

At block 440, the target vector TV is recalculated to reflect the fewer number ($N_2$) of remaining vectors $X_i$ to be distributed, taking into consideration the vectors such as $X_m$ and $X_p$ for example, that were selected for assignment to the first server $K_1$. The recalculated target vector TV can also reflect the fewer number of servers (e.g., $K_2=K-1$, to account for allocation of the first server $K_1$) to which the remaining tenants $N_2$ are to be allocated. For example, the target vector TV can be recalculated at block 440 to allocate a plurality of the remaining tenants $N_2$ to a second one of the K servers as:

$$TV = \frac{\sum_{i=1}^{N_2} X_i}{K_2} \quad (6)$$

The iterative process depicted in FIG. 4 returns to block 410, for selection of one or more vectors from the remaining vectors $X_i$, where to be allocated to a server corresponding to the second bucket $B_2$. The steps of selecting vectors that satisfy one or more expressions in the form of expressions (3)-(5) above, and determining whether such a vector exists at block 425 are repeated to fill the second bucket $B_2$. When a satisfying vector is determined to exist at block 425, the tenant corresponding to the satisfying vector is allocated to the second server $K_2$.

When a satisfying vector is determined not to exist at block 425, a refined set of remaining, unallocated vectors $N_3$ (i.e., corresponding to the tenants that have not been allocated to either the first server $K_1$ or the second server $K_2$) is defined at block 435. A new target vector TV is determined at block 440 to fill a third bucket $B_3$, to reflect the fewer number of remaining vectors $X_i$ to be distributed (i.e., vectors not allocated to the first or second servers $K_1$, $K_2$). The target vector TV recalculated at this point can also reflect the fewer number of servers (e.g., $K_3=K-2$, to account for allocation of tenants to the first server $K_1$ and the second server $K_2$) to which the remaining tenants $N_3$ are to be allocated.

The iterative process continues until all, or a defined plurality of the original vectors $X_i$ (i=1, ..., N) corresponding to all, or a defined plurality of the N tenants are distributed among the K original servers.

One goal of the iterative process is to distribute N vectors $X_i$ corresponding to the tenants among the K buckets, such that a fitness metric of vector distributions:

$$\max_{j=1,\ldots,K} \|S_j\| \tag{7}$$

is minimized among all possible distributions of N vectors $X_i$ among K buckets, where $S_j$ is a sum of all vectors distributed in j's bucket. Of course, alternative fitness metrics could be used according to other embodiments. The process described herein does not necessarily result in an absolute global minimum (GM), defined as:

$$GM = \min_{\text{all possible vectors distributions}} \left( \max_{j=1,\ldots,K} \|S_j\| \right) \tag{8}$$

However, the present process is useful to establish a vector distribution with the fitness metric defined in expression (7) that is a reasonable approximation to the global minimum GM in expression (8). This "closeness" of the fitness metric to the global minimum GM resulting from the present approach provides a sub-optimal solution, which is satisfactory to allocate tenants in a computationally-efficient manner.

For example, one way to guarantee a fitness metric equal to the global minimum GM is to evaluate a fitness metric defined as:

$$\max_{j=1,\ldots,K} \|S_j\|_\infty \tag{9}$$

for each and every possible distribution of N vectors $X_i$ among K buckets. Such an approach could work for a relatively-small values of N and K, but would be computationally expensive (i.e., consume an unacceptably large quantity of computational resources) for relatively-large values of N and K.

Consider an example where N=5 and K=2. In general $$\frac{K^N}{K!} \tag{10}$$

calculations of a fitness metric are required to consider every different distribution of N vectors $X_i$ among K buckets. For the present example, 16 calculations (2^5/2!) would be required for different vector distributions to reach the global minimum GM of the fitness metric, which is computationally inexpensive to do. But if N=1000 and K=100, (100^10000)/100! calculations would be required, which is too computationally expensive for practical purposes.

Figure 5:
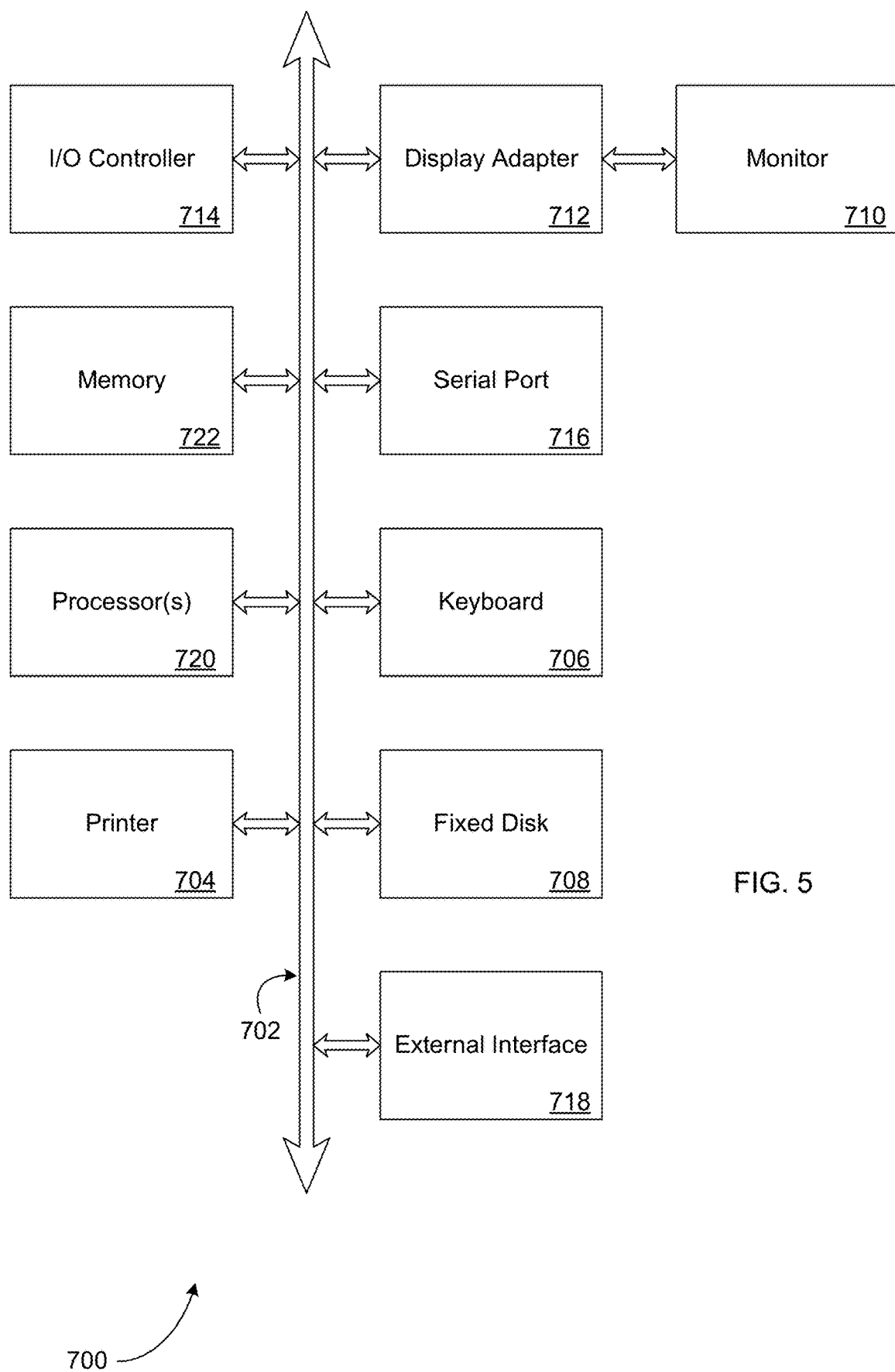
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for efficiently managing access to and usage of an extension or application installed on a multi-tenant platform may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 700 configured to implement a method, process, function, or operation in accordance with an embodiment of the invention. The subsystems shown in FIG. 5 are interconnected via a system bus 702. Additional subsystems include a printer 704, a keyboard 706, a fixed disk 708, and a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 5 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A non-transitory computer-readable medium storing computer-executable instructions that when executed by at least a processor of a computer system cause the computer system to:
   generate, by at least the processor, a data structure comprising a set of vectors corresponding to a plurality of tenants to be allocated to a plurality of platform resources that are network-accessible, wherein each vector is multi-dimensional and includes values indicating consumption of one or more of the platform resources by a respective tenant;
   determine, by at least the processor, a target vector for allocating a portion of the plurality of tenants to a first platform resource included among the platform resources, the target vector establishing a desired value of a sum of vectors allocated to the first platform resource;
   identify, by at least the processor, a first vector included in the set of vectors that satisfies a defined relationship with the target vector;
   allocate, by at least the processor, a tenant corresponding to the first vector to the first platform resource as a result of the first vector being identified;
   analyze, by at least the processor, the set of vectors to determine whether a second vector that satisfies a defined relationship with both the target vector and the first vector exists;
   as a result of determining that the second vector that satisfies the defined relationship with both the target vector and the first vector exists, allocate, by at least the processor, a tenant corresponding to the second vector to the first platform resource; and
   as a result of determining that the second vector that satisfies the defined relationship with both the target vector and the first vector does not exist, allocate, by at least the processor, the tenant corresponding to the second vector to a second platform resource, that is different from the first platform resource.

2. The non-transitory computer-readable medium of claim 1, wherein the instructions, when executed by at least the processor, cause the computer system to:
   identify the first vector as a vector in the set of vectors that minimizes a Euclidean norm of a difference between the target vector and the first vector.

3. The non-transitory computer-readable medium of claim 1, wherein the target vector is determined as:

$$TV = \frac{\sum_{i=1}^{N} X_i}{K}$$

where:
$X_i$ are all vectors for values of I=1, ..., N,
N is a positive integer that is greater than or equal to 2, and
K is a positive integer that is greater than or equal to 2, and is indicative of a quantity of the platform resources to which the plurality of tenants are to be allocated.

4. The non-transitory computer-readable medium of claim 1, further comprising instructions that, when executed by at least the processor, cause the computer system to:
   exclude the first vector from consideration during an analysis to determine whether the second vector that satisfies a defined relationship with both the target vector and the first vector exists.

5. The non-transitory computer-readable medium of claim 1, wherein the instructions, when executed by at least the processor, cause the computer system to:
   analyze the set of vectors to determine whether the second vector minimizes a Euclidean norm of a difference between: (i) the target vector, and (ii) a combination of the first vector and the second vector.

6. The non-transitory computer-readable medium of claim 5, wherein the instructions, when executed by at least the processor, cause the computer system to:
   analyze the set of vectors to determine whether the second vector satisfies the expression:

$$\|TV-X_m-X_p\| \leq \|TV-X_m-X_i\| \text{ for all } i=1, \ldots, N; i \neq m, i \neq p$$

where:
TV is the target vector,
$X_m$ is the first vector,
$X_p$ is the second vector,
$X_i$ is the $i^{th}$ vector for all values of i=1, ..., N, and
N is a positive integer that is greater than or equal to 2.

7. The non-transitory computer-readable medium of claim 1, wherein the instructions, when executed by at least the processor, further cause the computer system to:
   as a result of determining that the second vector that satisfies the defined relationship with both the target vector and the first vector does not exist:
   (i) define a refined set of remaining vectors, the remaining vectors comprising each vector included in the set of vectors except the first vector; and (ii) determine a different target vector to be utilized to allocate the tenant corresponding to the second vector to a second platform resource, that is different from the first platform resource.

8. The non-transitory computer-readable medium of claim 1, wherein the instructions, when executed by at least the processor, further cause the computer system to:
as a result of allocating the tenant corresponding to the first vector to the platform resource, control usage of the first platform resource by the tenant corresponding to the first vector.

9. A computing system, comprising:
a processor connected to a memory; and
an analysis module stored on a non-transitory computer readable medium and including instructions that when executed by at least the processor cause the computing system to:
generate a data structure comprising a set of vectors corresponding to a plurality of tenants to be allocated to a plurality of platform resources that are network-accessible, wherein each vector is multi-dimensional and includes values indicating consumption of one or more of the platform resources by a respective tenant;
determine a target vector for allocating a portion of the plurality of tenants to a first platform resource included among the platform resources, the target vector establishing a desired value of a sum of vectors allocated to the first platform resource;
identify a first vector included in the set of vectors that satisfies a defined relationship with the target vector;
allocate a tenant corresponding to the first vector to the first platform resource as a result of the first vector being identified;
analyze the set of vectors to determine whether a second vector that satisfies a defined relationship with both the target vector and the first vector exists;
as a result of determining that the second vector that satisfies the defined relationship with both the target vector and the first vector exists, allocate a tenant corresponding to the second vector to the first platform resource; and
as a result of determining that the second vector that satisfies the defined relationship with both the target vector and the first vector does not exist, allocate the tenant corresponding to the second vector to a second platform resource, that is different from the first platform resource.

10. The computing system of claim 9, wherein the analysis module further includes instructions that, when executed by at least the processor, cause the computing system to identify the first vector as a vector in the set of vectors that minimizes a Euclidean norm of a difference between the target vector and the first vector.

11. The computing system of claim 9, wherein the analysis module further includes instructions that, when executed by at least the processor, cause the computing system to determine the target vector as:

$$TV = \frac{\sum_{i=1}^{N} X_i}{K}$$

where:
$X_i$ are all vectors for values of I=1, ..., N,
N is a positive integer that is greater than or equal to 2, and
K is a positive integer that is greater than or equal to 2, and is indicative of a quantity of the platform resources to which the plurality of tenants are to be allocated.

12. The computing system of claim 9, wherein the analysis module further includes instructions that, when executed by at least the processor, cause the computing system to exclude the first vector from consideration during an analysis to determine whether the second vector that satisfies a defined relationship with both the target vector and the first vector exists.

13. The computing system of claim 9, wherein the analysis module further includes instructions that, when executed by at least the processor, cause the computing system to analyze the set of vectors to determine whether the second vector minimizes a Euclidean norm of a difference between: (i) the target vector, and (ii) a combination of the first vector and the second vector.

14. The computing system of claim 13, wherein the analysis module further includes instructions that, when executed by at least the processor, cause the computing system to analyze the set of vectors to determine whether the second vector satisfies the expression:

$$\|TV-X_m-X_p\| \leq \|TV-X_m-X_i\| \text{ for all } i=1, \ldots, N; i \neq m, i \neq p$$

where:
TV is the target vector,
$X_m$ is the first vector,
$X_p$ is the second vector,
$X_i$ is the $i^{th}$ vector for all values of i=1, ..., N, and
N is a positive integer that is greater than or equal to 2.

15. The computing system of claim 9, wherein the analysis module further includes instructions that, when executed by at least the processor, cause the computing system to:
as a result of determining that the second vector that satisfies the defined relationship with both the target vector and the first vector does not exist:
(i) define a refined set of remaining vectors, the remaining vectors comprising each vector included in the set of vectors except the first vector; and
(ii) determine a different target vector to be utilized to allocate the tenant corresponding to the second vector to a second platform resource, that is different from the first platform resource.

16. The computing system of claim 9, wherein the analysis module further includes instructions that, when executed by at least the processor, cause the computing system to:
as a result of allocating the tenant corresponding to the first vector to the platform resource, control usage of the first platform resource by the tenant corresponding to the first vector.

17. A computer-implemented method, the method comprising:
generating, by at least a processor, a data structure comprising a set of vectors corresponding to a plurality of tenants to be allocated to a plurality of platform resources that are network-accessible, wherein each vector is multi-dimensional and includes values indicating consumption of the platform resources by a respective tenant;
determining, by at least the processor, a target vector for allocating a portion of the plurality of tenants to a first platform resource included among the platform resources, the target vector establishing a desired value of a sum of vectors allocated to the first platform resource;

identifying, by at least the processor, a first vector included in the set of vectors that satisfies a defined relationship with the target vector;

allocating, by at least the processor, a tenant corresponding to the first vector to the first platform resource as a result of the first vector being identified;

analyzing, by at least the processor, the set of vectors to determine whether a second vector that satisfies a defined relationship with both the target vector and the first vector exists;

as a result of determining that the second vector that satisfies the defined relationship with both the target vector and the first vector exists, allocating, by at least the processor, a tenant corresponding to the second vector to the first platform resource; and as a result of determining that the second vector that satisfies the defined relationship with both the target vector and the first vector does not exist, allocating, by at least the processor, the tenant corresponding to the second vector to a second platform resource, that is different from the first platform resource.

18. The computer-implemented method of claim 17, wherein identifying the first vector comprises determining that the first vector, in the set of vectors, minimizes a Euclidean norm of a difference between the target vector and the first vector.

19. The computer-implemented method of claim 17, wherein analyzing the set of vectors to determine whether the second vector exists comprises determining whether the second vector minimizes a Euclidean norm of a difference between: (i) the target vector, and (ii) a combination of the first vector and the second vector.

20. The computer-implemented method of claim 17 further comprises:

as a result of determining that the second vector that satisfies the defined relationship with both the target vector and the first vector does not exist:
  (i) defining a refined set of remaining vectors, the remaining vectors comprising each vector included in the set of vectors except the first vector; and
  (ii) determining a different target vector to be utilized to allocate the tenant corresponding to the second vector to a second platform resource, that is different from the first platform resource.

* * * * *

UNITED STATES PATENT AND TRADEMARK OFFICE
CERTIFICATE OF CORRECTION

PATENT NO. : 11,178,065 B2  
APPLICATION NO. : 16/534201  
DATED : November 16, 2021  
INVENTOR(S) : Ignatyev Page 1 of 1

It is certified that error appears in the above-identified patent and that said Letters Patent is hereby corrected as shown below:

On the Title Page

On page 2, Column 1, Item (56) under U.S. Patent Documents, Line 15, delete "Chockier" and insert -- Chockler --, therefor.

On page 2, Column 1, Item (56) under U.S. Patent Documents, Line 17, delete "Chockier" and insert -- Chockler --, therefor.

In the Specification

In Column 14, Line 64, delete "l=1," and insert -- j=1, --, therefor.

In Column 15, Line 64, delete "i≠p" and insert -- i≠p. --, therefor.

In Column 16, Line 7, after "i≠m,p,q" insert -- . --.

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*